United States Patent [19]
Yoshihara

[11] Patent Number: 5,835,778
[45] Date of Patent: Nov. 10, 1998

[54] PREINITIALIZED LOAD MODULE MODIFYING SYSTEM

[75] Inventor: Shinji Yoshihara, Tokyo, Japan

[73] Assignee: NEC Corporation, Tokyo, Japan

[21] Appl. No.: 624,056

[22] Filed: Mar. 29, 1996

Related U.S. Application Data

[63] Continuation of Ser. No. 197,271, Feb. 16, 1994, abandoned.

[30] Foreign Application Priority Data

Feb. 19, 1993 [JP] Japan .................................... 5-054971

[51] Int. Cl.$^6$ ..................................................... G06F 9/45
[52] U.S. Cl. .......................... 395/712; 395/651; 711/100
[58] Field of Search .................................... 395/700, 300, 395/575, 712, 651, 653; 711/100

[56] References Cited

U.S. PATENT DOCUMENTS

| | | | |
|---|---|---|---|
| 4,930,073 | 5/1990 | Cina | 395/726 |
| 4,999,554 | 3/1991 | Naka | 318/569 |
| 5,086,502 | 2/1992 | Malcolm | 395/182.06 |
| 5,269,022 | 12/1993 | Shinjo et al. | 395/652 |

OTHER PUBLICATIONS

"ACOS–4/XVP System Operation/Consol Messages Handbook", DCA 81E–2, NEC Corporation, pp. 3–97 to 3–98, (1992).

*Primary Examiner*—Majid A. Banankhah
*Attorney, Agent, or Firm*—Foley & Lardner

[57] ABSTRACT

When a preinitialized load module 2 is modified, modifying command analysis means 401 registers modifying commands in a modifying command table 302, preinitialized load module loading means 402 loads a program portion 201 in a main memory 3, modifying command processing means 403 modifies a program image 301 according to the modifying command, preinitialized load module unloading means 404 reflects the image after modification to the program portion 201 and modifying command table unloading means 405 reflects the content of the modifying command table 302 to a modification history record portion 202. When the image in the modified portion is restored to the image before modification, modification restoring command analysis means 407 registers a modification restoring command in the modification restoring command table 303, modification history acquiring means 408 acquires the modifying command corresponding to the modification restoring command from the modification history record portion 202 and modification restoring means 409 restores the image before modification from the image in the portion indicated by the modifying command.

15 Claims, 14 Drawing Sheets

PREINITIALIZED LOAD MODULE MODIFYING SYSTEM

This application is continuation of application Ser. No. 08/197,271, filed Feb. 16, 1994, now abandoned.

DETAILED DESCRIPTION OF THE INVENTION

The present invention relates to a preinitialized load module modifying system for modifying a preinitialized load module in a computer system which utilizes a virtual memory system.

BACKGROUND OF THE INVENTION

In a computer system using a virtual memory system, it is conventional that a load module with an image at a time the load module is loaded in a main memory is registered in a backing store as a preinitialized load module and a loading of the latter to the main memory is performed during a page fault processing.

When the conventional preinitialized load module is to be modified, it is conventional to modify the load module first, then to preinitialize the modified load module to produce the preinitialized load module and finally to store the thus produced preinitialized load module in the backing store, as shown in "ACOS-4/XVP SYSTEM OPERATION/CONSOLE MESSAGES HANDBOOK", DCA81E-2, NEC CORPORATION, 1992, pp. 3-97 to 3-98.

In this conventional modifying method of the preinitialized load module, there is a problem that complicated operations of modifying a load module by either one of the method in which a source program corresponding to a load module to be modified is modified, compiled and linked and the method in which a load module is directly patched and then storing the modified load module in a backing store as a preinitialized load module must be performed every time a modification is necessary.

Further, in order to manage a modification made to the preinitialized load module, there is a problem that a user must record the content of modification made for the preinitialized load module.

Further, there may be a case where, although a preinitialized load module is modified, the modification is an error and so it is necessary to restore a program image before modification from a program image in the modified portion. In such case, the above mentioned troublesome operations of producing a preinitialized load module by modifying the load module and preinitializing it must be performed. When modifications made to a preinitialized load module in the past are not managed, there is another problem that it is impossible to restore a program image before modification from a program image which became an error by the modification.

An object of the present invention is to manage a content of modification made for a preinitialized load module.

Another object of the present invention is to easily restore a program image before modification from a program image of a modified portion of a preinitialized load module.

A further object of the present invention is to output a list of modification history showing a content of modifications of a preinitialized load module.

SUMMARY OF THE INVENTION

A preinitialized load module modifying system of a first invention has the following construction;

A preinitialized load module is constituted with a program portion and a modification history record portion.

Modifying command analyzing means registers modifying commands for the preinitialized load module in a modifying command table.

Preinitialized load module loading means loads the program portion of the preinitialized load module in a main memory as a program image.

Modifying command processing means modifies the program image loaded in the main memory by means of the preinitialized load module loading means according to the modifying command registered in the modifying command table.

Program image unloading means reflects the program image in the main memory, which is modified by the modifying command processing means, on the program portion of a backing store.

Modifying command table unloading means adds the modifying command registered in the modifying command table to the modification history record portion.

Main memory releasing means releases a region of the main memory which is secured by the preinitialized load module loading means.

A preinitialized load module modifying system of a second invention includes, in the preinitialized load module modifying system according to the first invention, the following construction.

The modifying command is constructed with a position of the preinitialized load module to be modified, a program image before modification and a program image after modified.

A preinitialized load module modifying system of a third invention includes, in the preinitialized load module modifying system according to the first and second inventions, the following construction:

Modification restoring command analyzing means registers a modification restoring command which instructs a modified position of the preinitialized load module and instructs a restoration of the program image before modification from the program image in that position in a modification restoring command table.

Modification history acquiring means acquires a modifying command corresponding to the modification restoring command registered in the modification restoring command table by means of the modification restoring command analyzing means from the modification history record portion.

Modification restoring means restores the program image before modification from the program image loaded in the main memory by means of the preinitialized load module loading means according to the modifying command acquired by the modification history acquiring means.

Program image unloading means reflects the program image in the main memory, which is restored by the modification restoring means, in the program portion of the preinitialized load module.

Modifying command deleting means deletes the modifying command, which is used by the modification restoring means to restore the program image before modification from the program image in the main memory, from the modification history record portion.

A preinitialized load module modifying system of a fourth invention includes, in the preinitialized load module modifying system according to the third invention, the following construction.

The modification restoring command is a command for instructing a restoration of the program image before modification from the program image in the modified portion modified by the modifying command and includes an address of the modified portion.

A preinitialized load module modifying system of a fifth invention includes, in the preinitialized load module modifying system according to the third and fourth inventions, the following construction.

Modification history record loading means loads the content of the modification history record portion in a modification history table of the main memory.

Modification history record editing means edits the content of the modification history record portion loaded in the modification history table by the modification history record loading means and outputs it as a list of modification history.

A preinitialized load module modifying system of a sixth invention includes, in the preinitialized load module modifying system according to the first and second inventions, the following construction.

Modifying command analyzing means includes an initialization step of open-processing of a modifying command file and initializing a counter in response to an activation instruction of a preinitialized load module modifying system, a modifying command acquiring step of acquiring a modifying command stored in the modification command file, a modifying command registering step of registering the modifying command acquired in the modifying command acquiring step and updating the content of the counter and an end processing step of notifying the preinitialized load module loading means a close processing of the modifying command file and a preinitialized load module name contained in the activation instruction.

The preinitialized load module loading means includes a main memory region securing step of securing a region of the main memory for loading the program portion of the preinitialized load module and storing a memory address and size thereof, a preinitialized load module loading step of loading the program portion of the preinitialized load module in the main memory as a program image and storing a disc address of the program portion, a modification history record loading step of adding the content of the modification history record portion of the preinitialized load module to the modifying command table and storing a disc address of the modification history record portion and an end processing step of transferring a control to the modifying command processing means.

The modifying command processing means includes an initializing step of initializing a counter under control of the preinitialized load module loading means, a modifying command acquiring step of acquiring a modifying command from the modifying command table and a modifying command processing step of modifying the program image loaded in the main memory by the preinitialized load module loading means according to the modifying command acquired in the modifying command acquiring step and updating the content of the counter.

Program image unloading means includes an initializing step of initializing a counter, a modifying command acquiring step of acquiring a modifying command from the modifying command table, a program address acquiring step of acquiring a disc address of a program portion corresponding to a memory address of a modifying portion of the program image modified by the modifying command acquired in the modifying command acquiring step and a program image copying step of copying the program image of the memory address obtained in the program address acquiring step in a program portion of the disc address and updating the content of the counter.

Modifying command table unloading means includes a modifying command address acquiring step of acquiring a disc address of a modification history record portion corresponding to the memory address of the modifying command table and a modifying command copying step of adding the modifying command registered in the modifying command table to the modification history record portion.

The main memory releasing means includes a main memory address acquiring step of acquiring an address and size of the region of the main memory secured by the preinitialized load module loading means and a main memory releasing step of releasing the region of the main memory according to the address and size of the region of the main memory acquired in the main memory region address acquiring step.

A preinitialized load module modifying system of a seventh invention includes, in the preinitialized load module modifying system according to the third, fourth and sixth inventions, the following construction:

The modification restoring command analyzing means includes an initializing step of initializing an open processing of a modification restoring command file and a counter in response to an activation instruction of the pre-initialed load module modifying system, a modification restoring command acquiring step of acquiring a modification restoring command stored in the modification restoring command file, a modification restoring command registering step of registering the modification restoring command acquired in the modification restoring command acquiring step in the modification restoring command table and updating the value of the counter and an end processing step of notifying a close processing of the modification restoring command file and a pre-initialized load module name contained in the activation instruction to the preinitialized load module loading means.

The preinitialized load module loading means includes a main memory region securing step of securing a region of a main memory for loading a program portion of the preinitialized load module and storing a memory address and size, a preinitialized load module loading step of loading the program portion of the preinitialized load module in the main memory as a program image and storing a disc address of the program portion and an end processing step for transferring a control to the modification history acquiring processing means.

The modification history acquiring means includes an initializing step of initializing a counter under the control transferred from the preinitialized load module loading means, a modification restoring command acquiring step of acquiring a modification restoring command from the modification restoring command table and a modifying command acquiring step of acquiring a modifying command corresponding to the modification restoring command acquired in the modifying command acquiring step from the modification history record portion, registering it in the modifying command table and updating the value of the counter.

The modification restoring means includes an initializing step of initializing a counter, a modification restoring command acquiring step of acquiring a modification restoring command from the modification restoring command table and a modifying command processing step of restoring the program image before modification from the program image loaded in the main memory by the preinitialized load module loading means, according to the modifying command acquired in the modifying command acquiring step and updating the value of the counter.

Program image unloading means includes an initializing step of initializing a counter, a modifying command acquiring step of acquiring a modifying command from the modifying command table, a program address acquiring step of acquiring a disc address of a program portion corresponding to a memory address of a modifying portion of the program image modified by the modifying command acquired in the modifying command acquiring step and a program image copying step of copying the program image of the memory address obtained in the program address acquiring step in a program portion of the disc address and updating the content of the counter.

Modifying command deleting means includes an initializing step of initializing a counter and a modifying command deleting step of deleting the modifying command registered in the modifying command table from the modification history record portion and updating the value of the counter.

The main memory releasing means includes a main memory address acquiring step of acquiring an address and size of the region of the main memory secured by the preinitialized load module loading means and a main memory releasing step of releasing the region of the main memory according to the address and size of the region of the main memory acquired in the main memory region address acquiring step.

A preinitialized load module modifying system of an eighth invention includes, in the preinitialized load module modifying system according to the sixth and seventh inventions, the following construction.

Modification history record loading means includes a modification history table address acquiring step of storing a memory address of the modification history table and a modification history record loading step of loading a content of the modification history record portion in the modification history table.

Modification history record editing means includes an initializing step of preparing an output with respect to a printer, a modification history record editing and outputting step of editing the content of the modification history record portion loaded in the modification history table in a table format and outputting it to the printer as a list of modification history and an end processing step of processing after the output to the printer.

BRIEF DESCRIPTION OF THE DRAWINGS

Other objects, features, workings and effects of the present invention will become more apparent by the following description in conjunction with the accompanying drawings, wherein.

In these figures, same reference numerals depict same constructive components, respectively.

EMBODIMENTS

Figure 1:
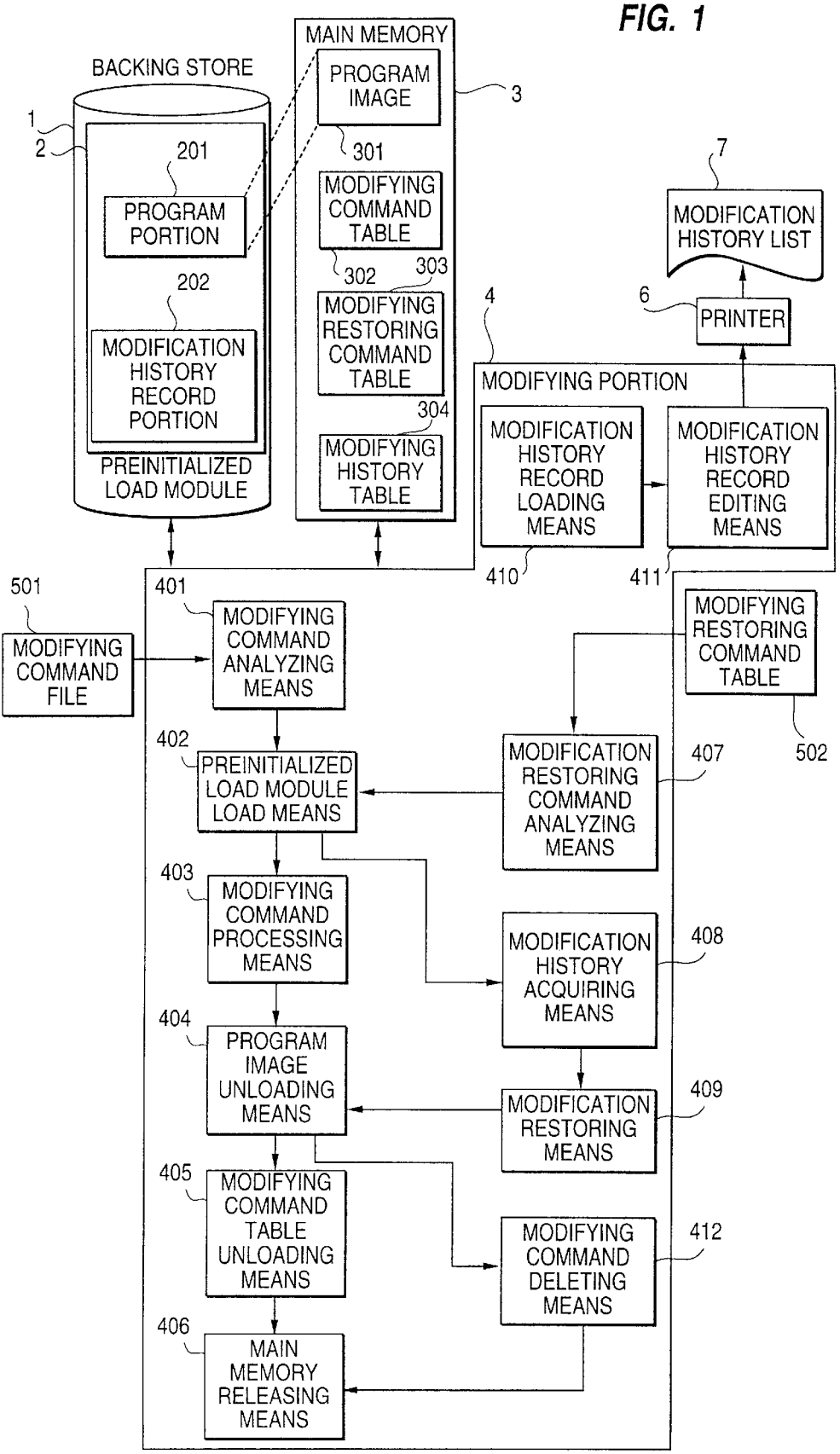
FIG. 1 is a block diagram showing a first to third embodiment of the present invention.

Referring to FIG. 1, a preinitialized load module modifying system according to the first embodiment of the present invention is constituted with a backing store 1, a preinitialized load module 2 composed of a program portion 201 and a modification history record portion 202, a main memory 3 containing a program image 301 and a modifying command table 302, a modifying portion 4 and a modifying command file 501 storing the modifying commands.

The modifying portion 4 is composed of a modifying command analysis program (referred to as "modifying command analyzing means", hereinafter) 401 which is a program for registering a modifying command for the preinitialized load module 2 in the modifying command table 302, a preinitialized load module loading program (referred to as "preinitialized load module loading means", hereinafter) 402 which is a program for loading the program portion 201 of the preinitialized load module 2 in the main memory 3 as the program image 301, a modifying command processing program (referred to as "modifying command processing means", hereinafter) 403 which is a program for modifying the program image 301 according to the modifying command, a program (referred to as "program image unloading means", hereinafter) 404 for reflecting the program image 301 on the program portion 201 of the backing store 1, a modifying command table unloading program (referred to as "modifying command table unloading means", hereinafter) 405 which is a program for registering the modifying command in the modification history record portion 202 of the backing store 1 and a main memory releasing program (referred to as "main memory releasing means", hereinafter) 406 which is a program for releasing a region of the main memory 3 which is secured by the preinitialized load module loading means 402.

An operation of the first embodiment of the present invention will be described with respect to a case where the preinitialized load module 2 is modified, with reference to FIGS. 1 to 7.

When an operator modifies the preinitialized load module 2, the operator inputs, through a key board, etc., an activation instruction including a name of the preinitialized load module 2 to be modified to the modifying command analyzing means 401.

Figure 2:
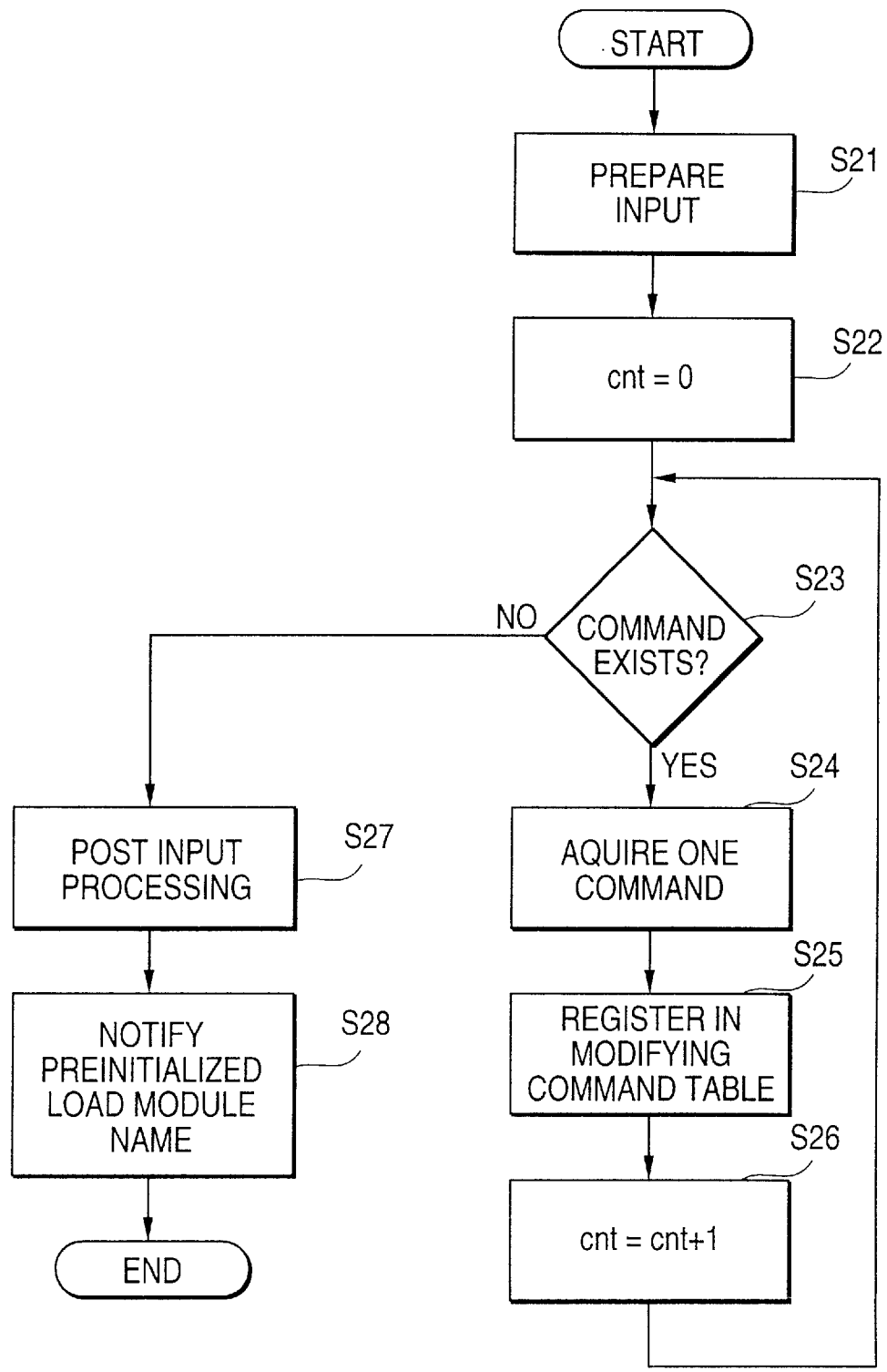
FIG. 2 is a flowchart showing a processing to be performed by a modifying command analysis means 401 of the first embodiment of the present invention.

The modifying command analyzing means 401 responds to the activation instruction to first prepare an input of the modifying command such as an open processing of the modifying command file 501 (step S21), as shown in FIG. 2. Then, the modifying command analyzing means 401 sets a count value cnt of a counter to 0 (step S22) and acquires a modifying command corresponding to the count value cnt from the modifying command file 501 (step S24). The count value cnt=0 corresponds to a modifying command stored in the top portion of the modifying command file 501 and the count value cnt=1 corresponds to a second modifying command, etc. Further, the modifying command includes an address indicating a location to be modified, a program image before modification and a program image after modification.

Next, the modifying command analyzing means 401 registers the modifying command acquired in the step S24 in the modifying command table 302 (step S25), and increments the count value cnt by +1 (step S26). When a modifying command corresponding to this count value cnt exists in the modifying command file 501 (YES in the step S23), the processing in the step S24 is performed. When there is no modifying command corresponding to the count value cnt in the modifying command file 501, that is, when all of the modifying commands stored in the modifying command file 501 are input (NO in the step S23), a processing in the step S27 is performed.

At step S27, an post input processing such as a close processing of the modifying command file 501 is performed and, in step S28, the name of the preinitialized load module 2 contained in the activation instruction is notified to the preinitialized load module loading means 402.

Figure 3:
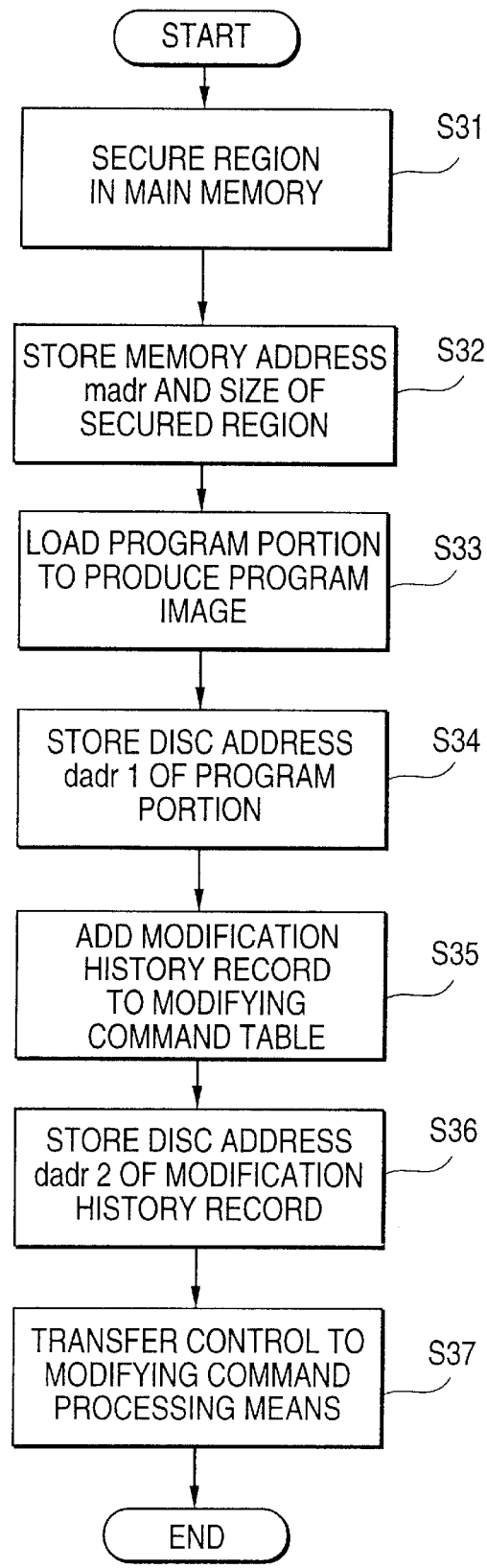
FIG. 3 is a flowchart showing a processing to be performed by a preinitialized load module loading means 402 of the first embodiment of the present invention.

The preinitialized load module loading means 402 responds to the notice of the name of the preinitialized load module 2 to hold a region of the main memory 3 whose size corresponds to a size of the program portion 201 of the preinitialized load module 2 (step S31) and store its memory address madr and the size therein (step S32), as shown in FIG. 3.

Then, the preinitialized load module loading means 402 loads the program portion 201 of the preinitialized load module 2 in the region of the main memory 3 which is held in the step S31 to thereby produce the program image 301 (step S33) and store a disc address dadr1 of the program portion 201 (step S34).

Thereafter, the preinitialized load module loading means 402 adds a content of the modification history record portion 202 of the preinitialized load module 2 to the modifying command table 302 (step S35) and stores a disc address dadr2 of the modification history record portion 202 (step S36).

The preinitialized load module loading means 402 transfers a control to the modifying command processing means 403 (step S37).

Figure 4:
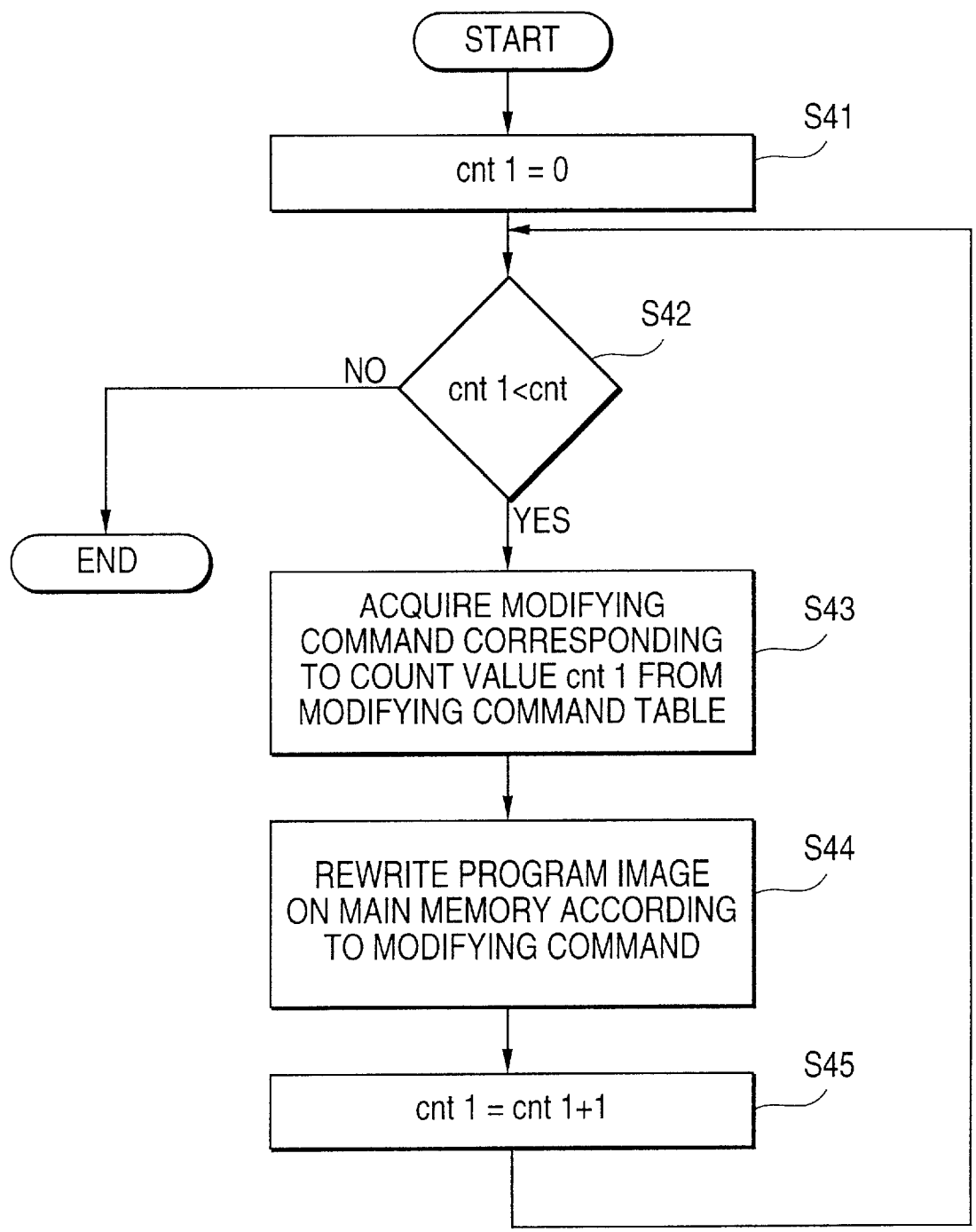
FIG. 4 is a flowchart showing a processing to be performed by a modifying command processing means 403 of the first embodiment of the present invention.

The modifying command processing means 403, when it receives the control from the preinitialized load module loading means 402, sets the count value cnt1 as 0 as shown in FIG. 4 (step S41) and acquires a modifying command corresponding to the count value cnt1 from the modifying command table 302 (step S43). The count value cnt1=0 corresponds to the modifying command registered at the top of the modifying command table 302 and the count value cnt=1 corresponds to the second modifying command.

When the modifying command is acquired in the step S43, the modifying command processing means 403 modifies the program image 301 in the main memory 3 according to the acquired modifying command (step S44). That is, the modifying command processing means 403 rewrites the program image in the location indicated by the address contained in the modifying command with a program image after modification which is contained in the modifying command.

Thereafter, the modifying command processing means 403 increments the count value cnt1 by +1 (step S45) and repeats the steps S42 to S45 of the processing means 403 until the count value cnt1 becomes equal to the count value cnt, that is, until the modifying command analysis means 401 completes the processing of all modifying commands registered in the modifying command table 302.

Figure 5:
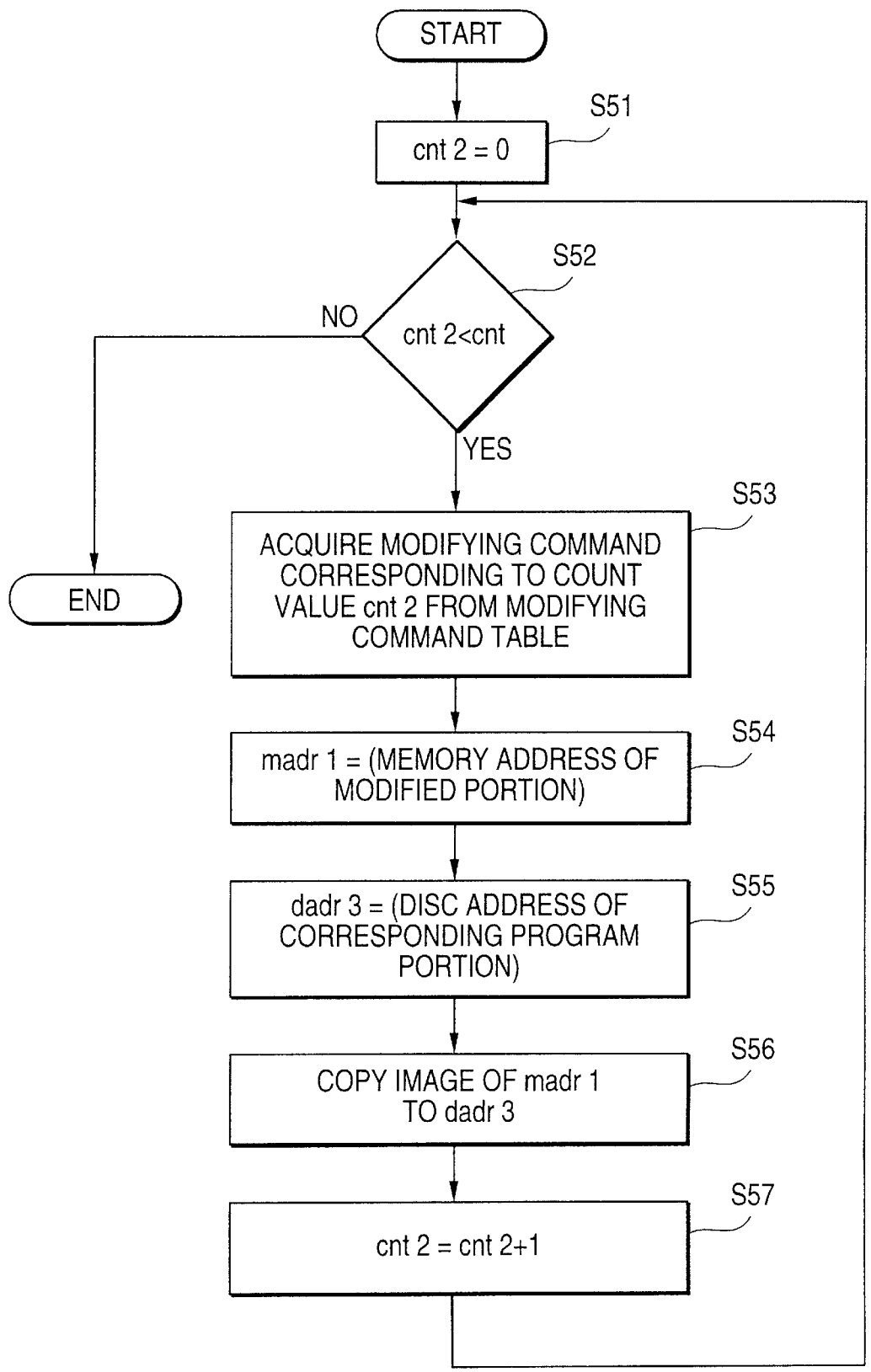
FIG. 5 is a flowchart showing a processing to be performed by a program image unloading means 404 of the first embodiment of the present invention.

When the processing in the modifying command processing means 403 completes, the program image unloading means 404 sets the count value cnt2 as 0 (step S51) and acquires a modifying command corresponding to the count value cnt2 from the modifying command table 302 (step S53), as shown in FIG. 5.

Then, the program image unloading means 404 obtains the memory address madr1 of the location of the program image 301 which is modified by the modifying command acquired in the step S53 (step S54) and further a disc address dadr3 of the program portion 201 corresponding thereto (step S55).

Then, the program image unloading means 404 copies the program image of the memory address madr1 obtained in the step S54 to the disc address dadr3 obtained in the step S55 (step S56).

Thereafter, the program image unloading means 404 increments the count value cnt2 by +1 (step S57) and repeats the steps S52 to S57 until the count value cnt2 becomes equal to the count value cnt, that is, until the modifying command analysis means 401 completes the processing of all modifying commands registered in the modifying command table 302 (NO in the step S52).

Figure 6:
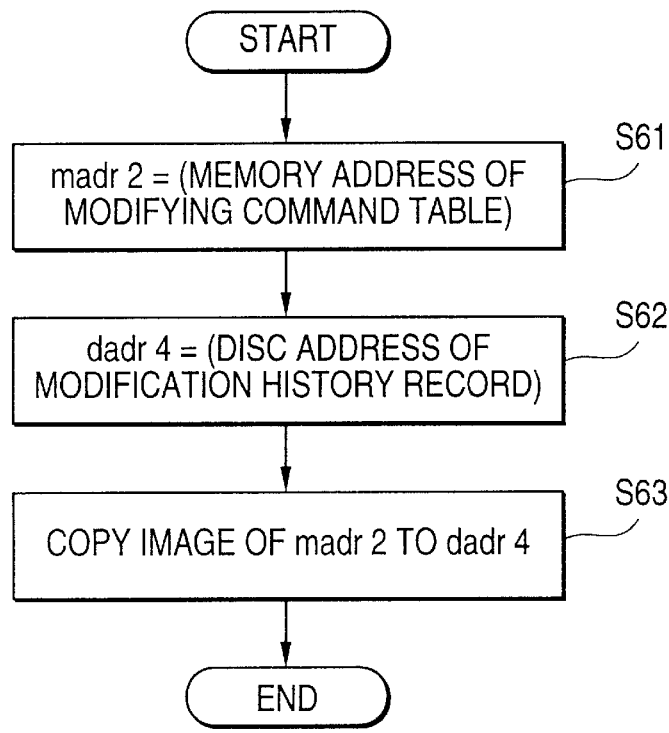
FIG. 6 is a flowchart showing a processing to be performed by a modifying command table unloading means 405 of the first embodiment of the present invention.

When the processing in the program image unloading means 404 is complete, the modifying command table unloading means 405 obtains the memory address madr2 from the modifying command table 302 (step S61) and a disc address dadr4 of the program portion 201 (step S62) and, based on these addresses, copies the content of the modifying command table 302 to the disc address dadr4 of the modification history record portion 202 in the backing store 1 (step S63), as shown in FIG. 6.

Figure 7:
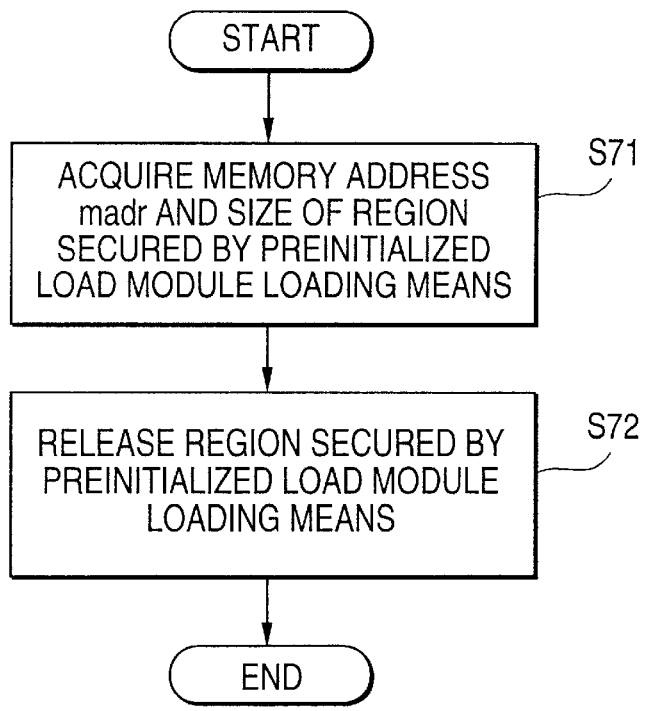
FIG. 7 is a flowchart showing a processing to be performed by a main memory releasing means 406 of the first embodiment of the present invention.

When the modification of the modifying command table unloading means 405 is complete, the main memory releasing means 406 obtains the memory address madr and size of the region secured by the preinitialized load module loading means 402 (step S71) and, on the basis thereof, releases the region secured by the preinitialized load module loading means 402 (step S72), as shown in FIG. 7.

Thus, the processing of the preinitialized load module modifying system according to the first embodiment of the present invention is completed.

The preinitialized load module modifying system according to the first embodiment of the present invention in which the preinitialized load module is composed of the program portion and the modification history record portion and which includes the modifying command table unloading means for reflecting the content of the modifying command table to the modification history record portion after the modifying command processing means modifies it according to the modifying command registered in the modifying command table allows the system to manage the content of modification made to the preinitialized load module.

Referring to FIG. 1, the preinitialized load module modifying system according to the second embodiment of the present invention is featured by that, in the first and second preinitialized load module modifying systems, the main memory 3 includes a modification restoring command table 303 and a modification restoring command file 502 storing the modification restoring commands.

The modifying portion 4 is composed of a modification restoring command analysis program (referred to as "modification restoring command analysis means", hereinafter) 407 which is a program for registering a modification restoring command for indicating a position of the preinitialized load module 2 to be modified and instructing a restoration of a program image in that position in the modification restoring command table 303, a modification history acquiring program (referred to as "modification history acquiring means", hereinafter) 408 which is a program for acquiring a modifying command corresponding to the modification restoring command from the modification history record portion 202, a modification restoring program (referred to as "modification restoring means", hereinafter) 409 which is a program for restoring a program image before modification according to a modifying command and a modifying command deleting program (referred to as "modifying command deleting means", hereinafter) 412 which is a program for deleting the modifying command from the modification history record portion 202.

An operation of the second embodiment of the present invention will be described with respect to a case where a program image before modification in a portion of the preinitialized load module 2 which is modified according to a modifying command is restored, with reference to FIGS. 1 and 8 to 14.

When an operator restores a program image before modification from a program image in a position of the preinitialized load module 2 which is modified, the operator inputs, through a key board (not shown), etc., an activation instruction including a name of the preinitialized load module 2 to the modification restoring command analysis means 407.

Figure 8:
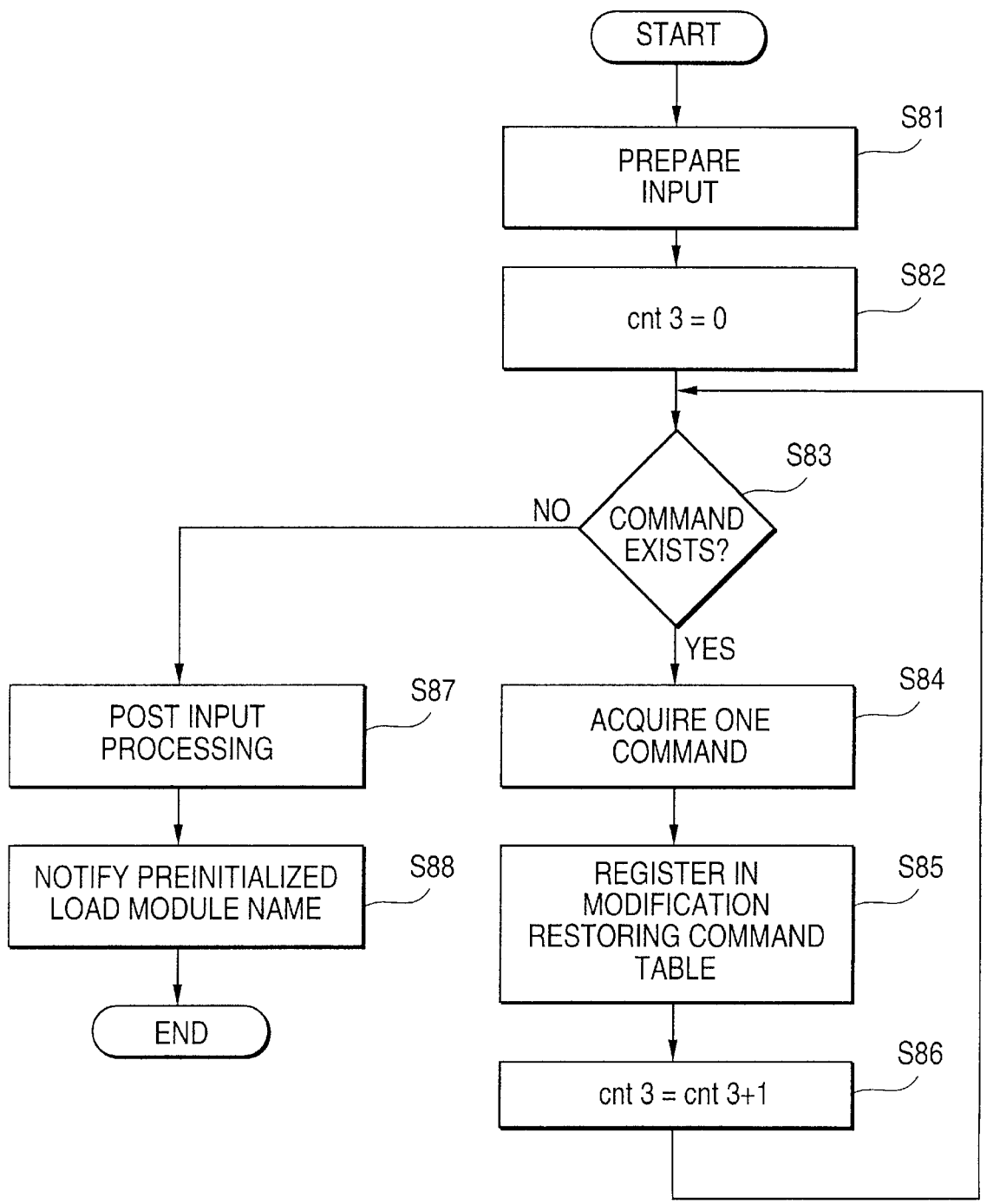
FIG. 8 is a flowchart showing a processing to be performed by a modification restoring command analyzing means 407 of the second embodiment of the present invention.

The modification restoring command analysis means 407 responds to the activation instruction to prepare an input such as an open processing of the modification restoring command file 502 (step S81) and sets the count value cnt3 to 0 (step S82), as shown in FIG. 8.

Then, the modification restoring command analysis means 407 acquires a modification restoring command corresponding to the count value cnt3 from the modification restoring command file 502 (step S84) and registers the acquired modification restoring command in the modification restoring command table 303 (step S85). The modification restoring command is a command which instructs to restore the program image before modification from the program image in the position modified by the modifying command and includes an address of the modified position. For example, the modification restoring command instructing a restoration of the program image in the position modified by the modifying command containing an address A contains the address A.

Then, the modification restoring command analysis means 407 increments the count value cnt3 by +1 (step S86) and, when a modification restoring command corresponding to this count value cnt3 exists in the modification restoring command file 502 (YES in the step S83), it is acquired (step S84). When there is no modification restoring command, post input processing such as a close processing of the modification restoring command file 502 is performed, the name of the preinitialized load module 2 contained in the activation instruction is notified to the preinitialized load module loading means 402 (step S88).

Figure 11:
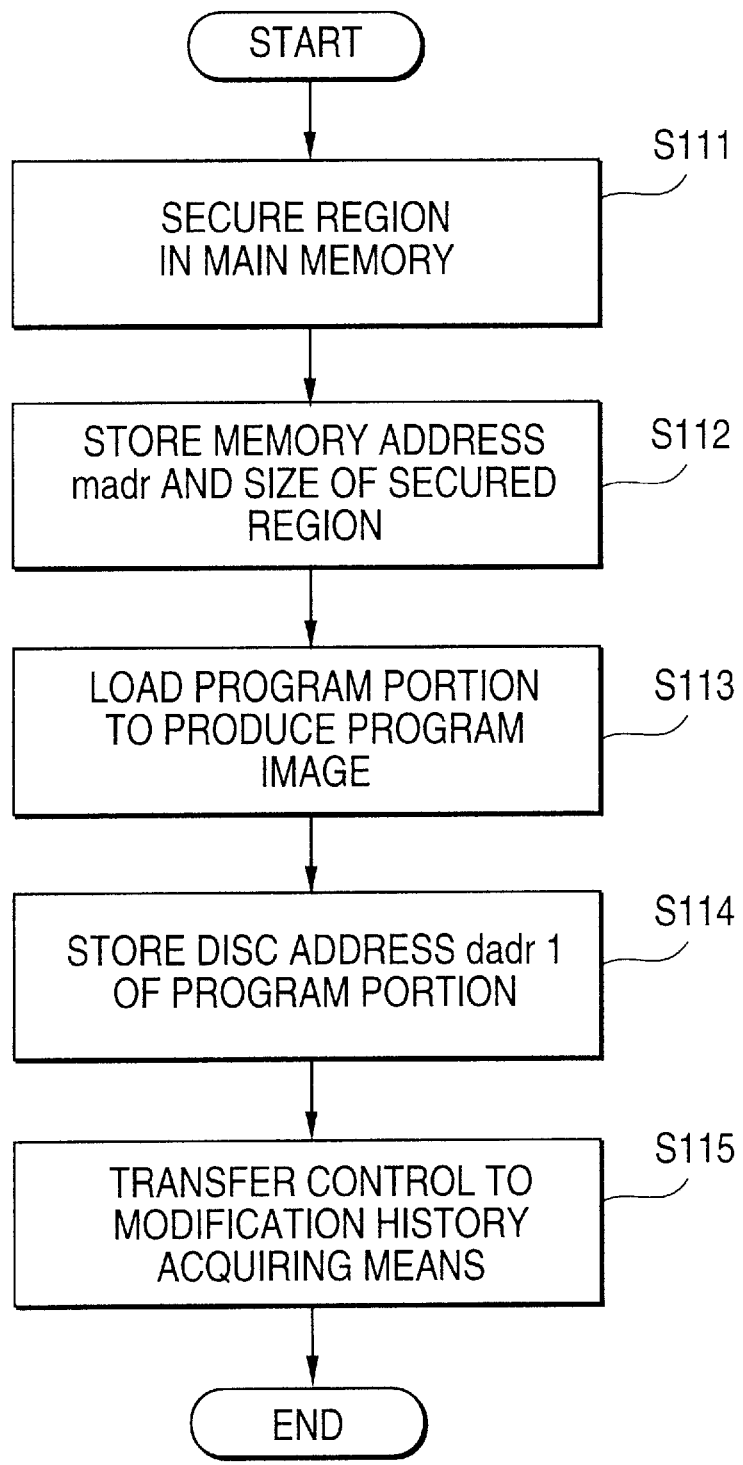
FIG. 11 is a flowchart showing a processing to be performed by a preinitialized load module loading means 402 of the second embodiment of the present invention.

The preinitialized load module loading means 402 responds to the notice of the name of the preinitialized load module 2 from the modification restoring command analysis means 407 to hold a region of the main memory 3 whose size corresponds to a size of the program portion 201 of the preinitialized load module 2 (step S111) and store its memory address madr and the size therein (step S112), as shown in FIG. 11.

Then, the preinitialized load module loading means 402 loads the program portion 201 of the preinitialized load module 2 in the region of the main memory 3 which is held in the step S111 to thereby produce the program image 301 (step S113) and store a disc address dadr1 of the program portion 201 (step S114).

Then, the preinitialized load module loading means 402 transfers the control to the modification history acquiring means 408 (step S115).

Figure 9:
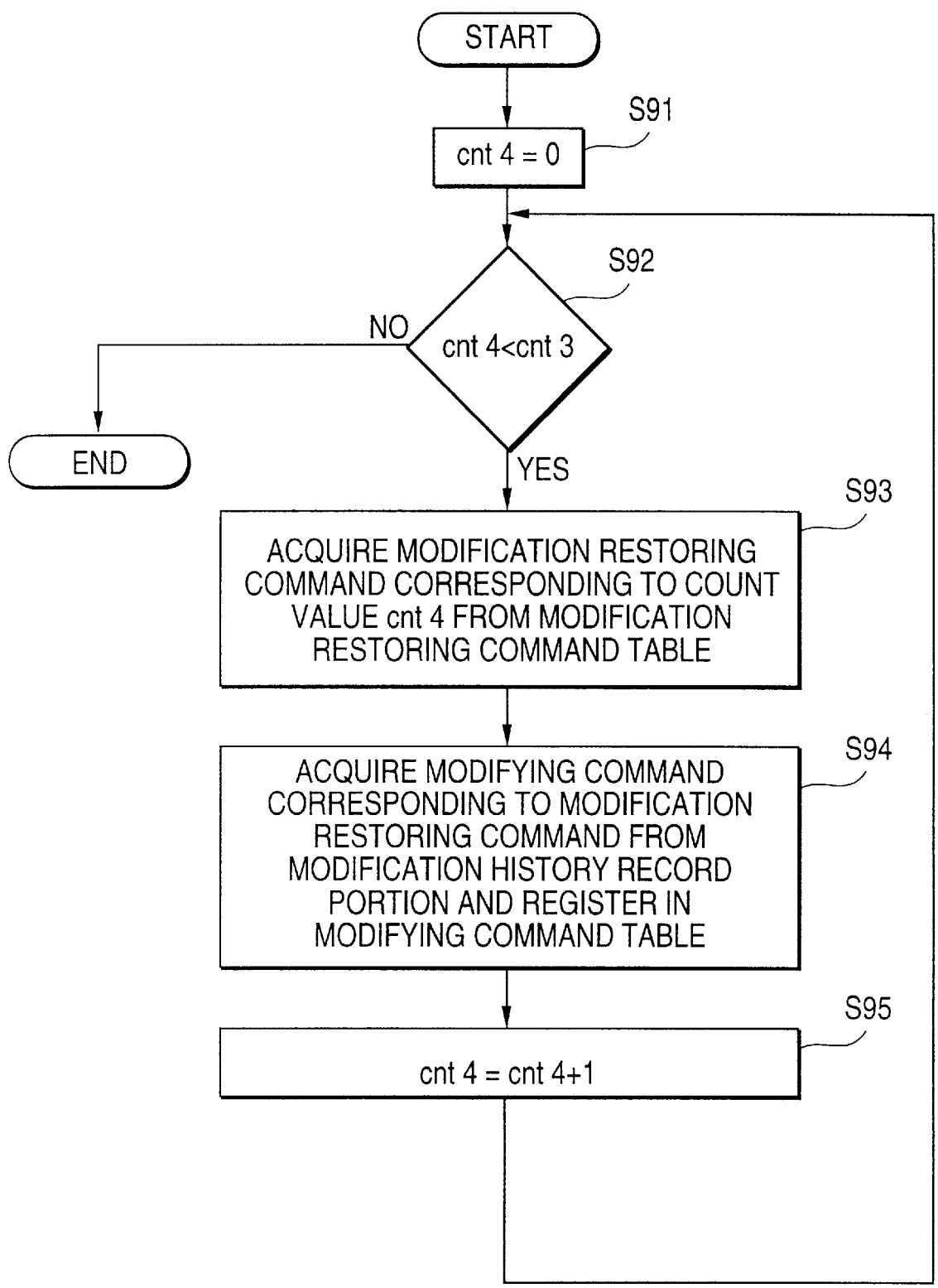
FIG. 9 is a flowchart showing a processing to be performed by a modification history deleting means 408 of the second embodiment of the present invention.

The modification history acquiring means 408, when it receives the control from the preinitialized load module loading means 402, sets the count value cnt4 as 0 as shown in FIG. 9 (step S91) and acquires a modification restoring command corresponding to the count value cnt4 from the modification restoring command table 303 (step S93).

When the modifying command is acquired, the modification history acquiring means 408 searches the modification history record portion 202 in the backing store 1, acquires a modifying command having the same address as that of the acquired modification restoring command and registers it in the modifying command table 302 (step S94).

Thereafter, the modification history acquiring means 408 increments the count value cnt4 by +1 (step S95) and repeats the steps S92 to S95 until the count value cnt4 becomes equal to the count value cnt3, that is, until there is no non-processed modification restoring command registered in the modification restoring command table 303 by the modification restoring command analysis means 407 (NO in the step S92).

Figure 10:
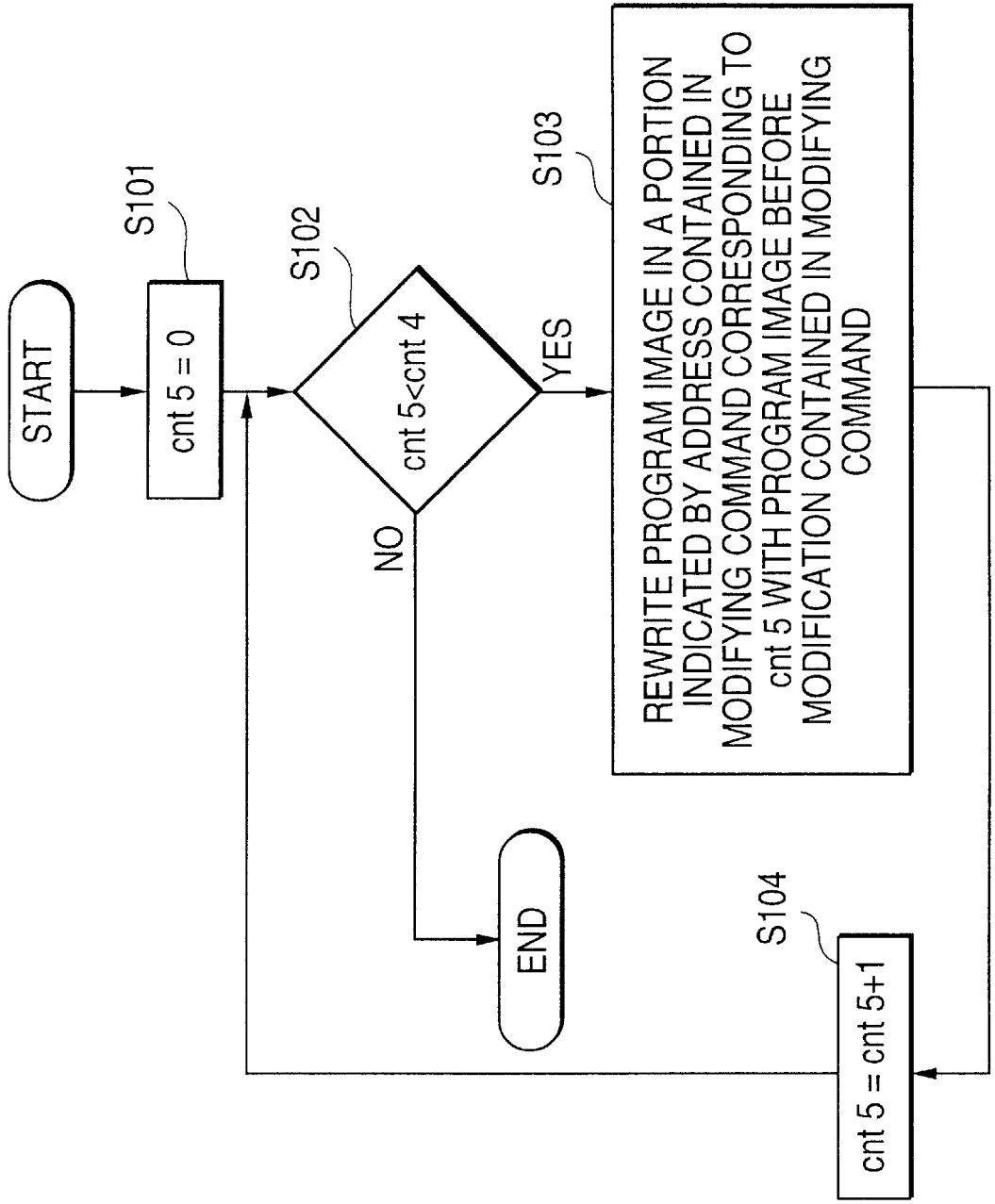
FIG. 10 is a flowchart showing a processing to be performed by a modification restoring means 409 of the second embodiment of the present invention.

When the processing in the modification history acquiring means 408 completes, the modification restoring means 409 sets the count value cnt5 as 0 (step S101) and rewrites the program image in the position indicated by the address contained in the modifying command corresponding to the count value cnt5 set in the modifying command table 302 with the program image before modification which is contained in the modifying command (step S103), as shown in FIG. 10. That is, the program image before modification and the program image after modification when the preinitialized load module 2 is modified in the first embodiment are exchanged to restore the program image before modification.

Then, the modification restoring means 409 incrememts the count value cnt5 by +1 (step S104) and repeats the steps S102 to S104 until the count value cnt5 becomes equal to the count value cnt4, that is, until the modification history acquiring means 408 processes all of the modifying commands registered in the modifying command table 302 (NO in the step S102).

Figure 12:
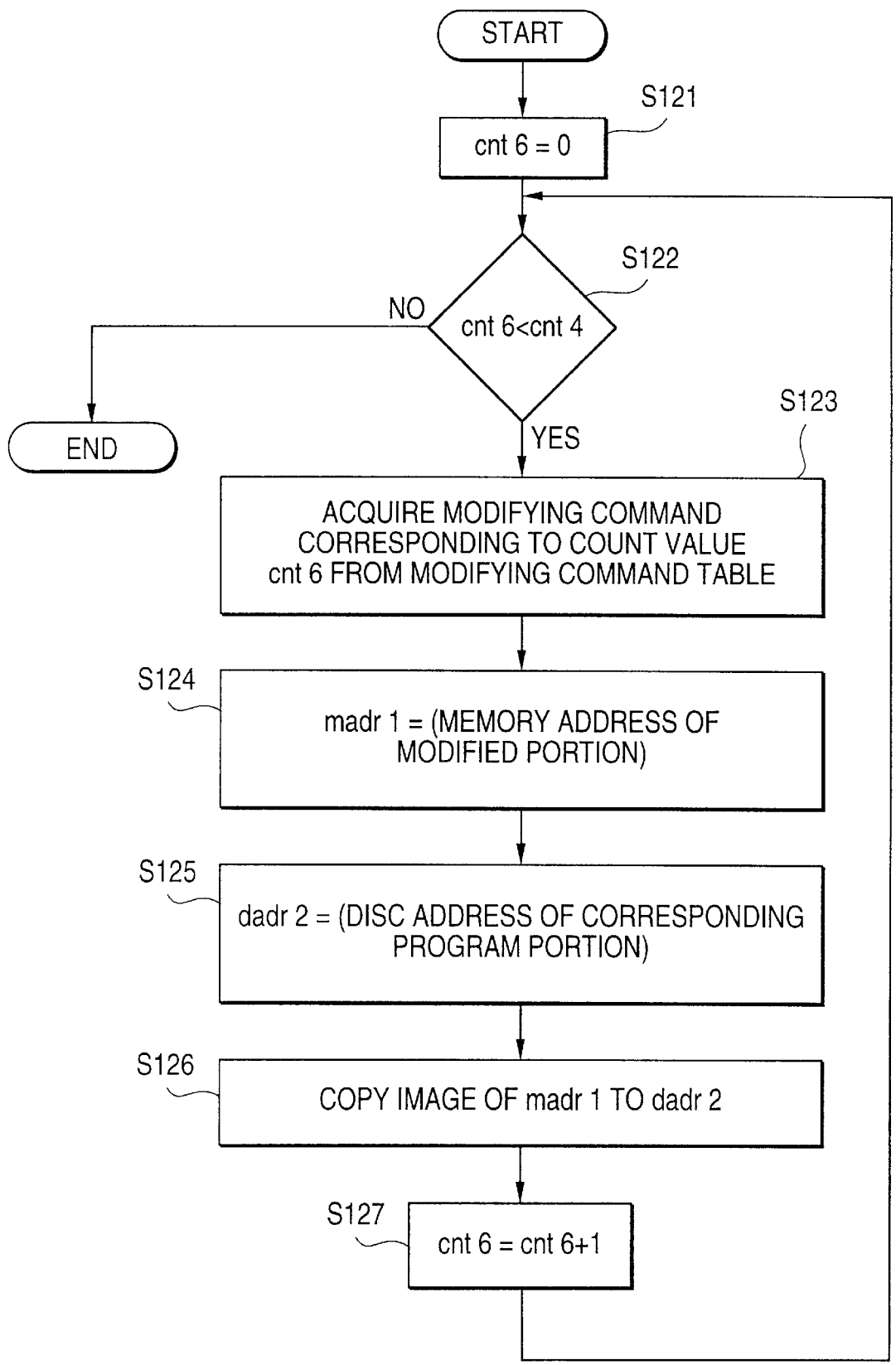
FIG. 12 is a flowchart showing a processing to be performed by a program image unloading means 404 of the second embodiment of the present invention.

When the processing in the modification restoring means 409 completes, the program image unloading means 404 sets the count value cnt6 to 0 (step S121) and acquires a modifying command corresponding to the count value cnt6 from the modifying command table 302 (step S123), as shown in FIG. 12.

Then, the program image unloading means 404 obtains the memory address madr1 of the modified position of the program image 301 modified by the acquired modifying command (step S124) and further obtain a corresponding disc address dadr2 of the program portion 201 (step S125).

Then, the program image unloading means 404 copies the program image of the memory address madr1 obtained in the step S124 to the disc address dadr2 obtained in the step S125 (step S126).

Thereafter, the program image unloading means 404 increments the count value cnt6 by +1 (step S127) and repeats the steps S122 to S127 until the count value cnt6 becomes equal to the count value cnt4, that is, until all modifying commands registered in the modifying command table 302 by the modification history acquiring means 408 are processed (NO in the step S122).

Figure 13:
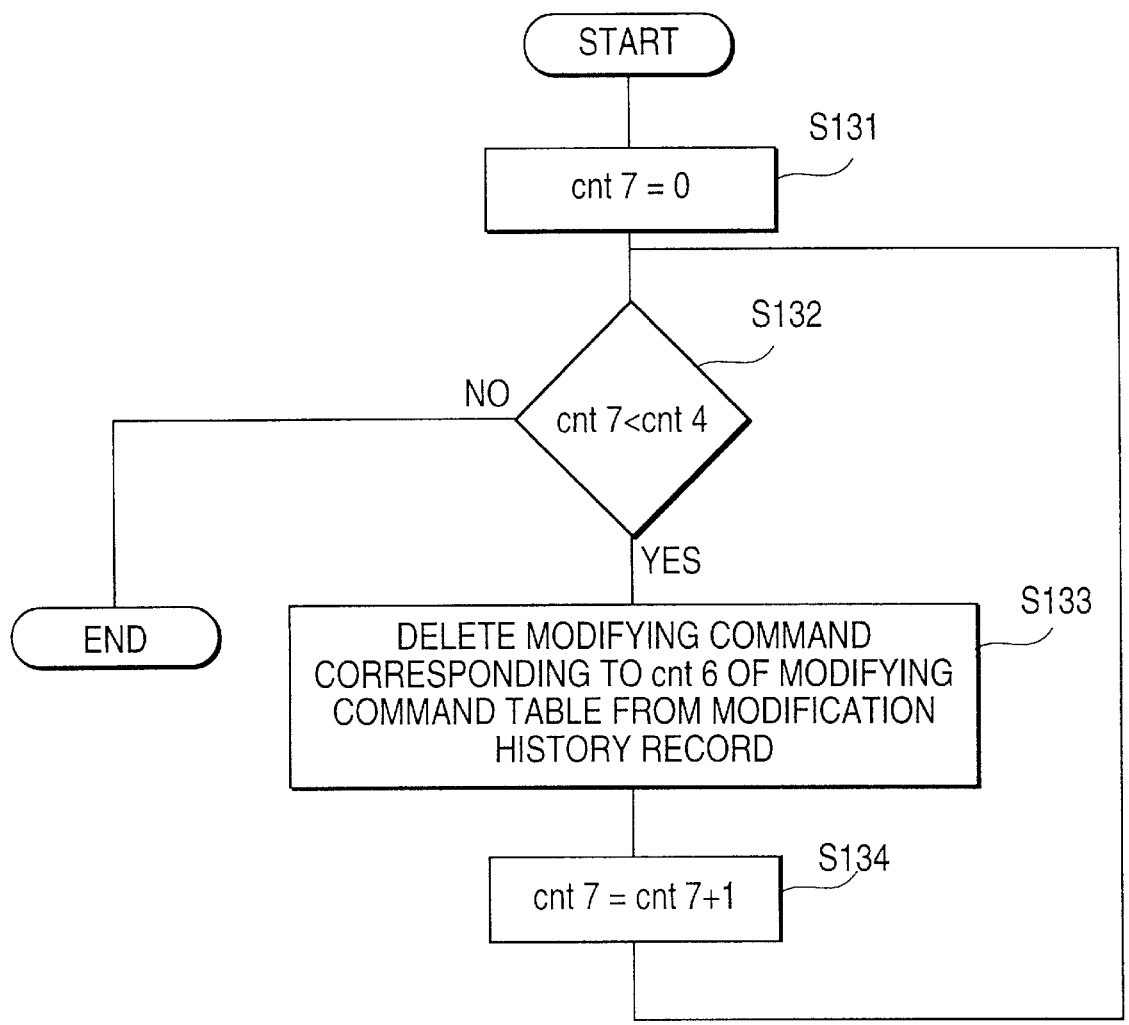
FIG. 13 is a flowchart showing a processing to be performed by a modifying command deleting means 412 of the second embodiment of the present invention.

Upon completion of the processing in the program image unloading means 404 completes, the modifying command deleting means 412 sets the count value cnt7 to 0 (step S131), acquires a modifying command corresponding to the count value cnt7 from the modifying command table 302 and deletes it from the modification history record portion 202 (step S133), as shown in FIG. 13.

Thereafter, the modifying command deleting means 412 increments the count value cnt7 by +1 (step S134) and repeats the steps S132 to S134 until the count value cnt7 becomes equal to the count value cnt4, that is, until all modifying commands registered in the modifying command table 302 by the modification history acquiring means 408 are processed (NO in the step S132).

Figure 14:
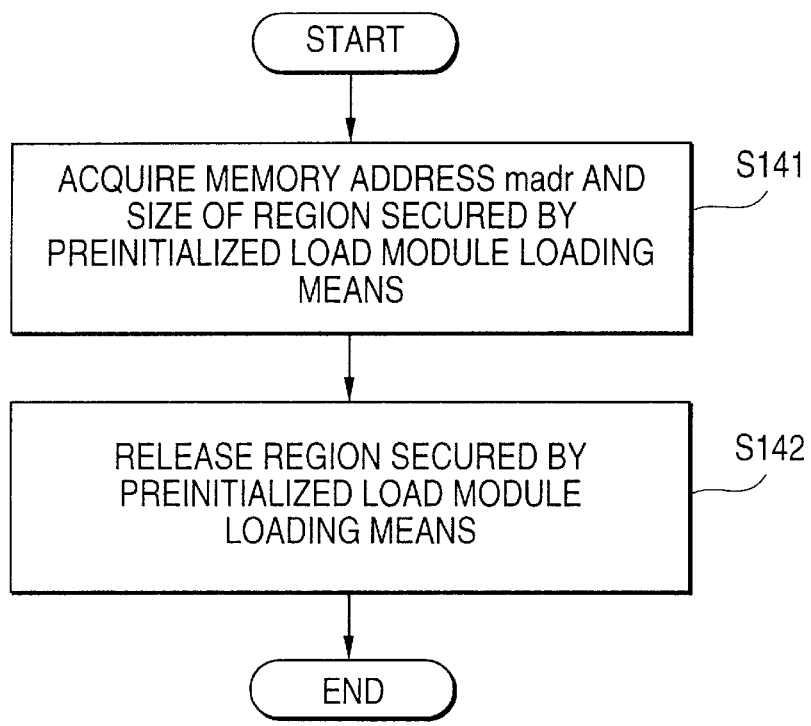
FIG. 14 is a flowchart showing a processing to be performed by a main memory releasing means 406 of the second embodiment of the present invention.

When the modification of the modifying command deleting means 412 completes, the main memory releasing means 406 acquires the memory address madr and size of the region secured by the preinitialized load module loading means 402 (step S141) and, on the basis thereof, releases the region secured by the preinitialized load module loading means 402 (step S142), as shown in FIG. 14.

Thus, the processing of the preinitialized load module modifying system according to the second embodiment of the present invention is completed.

The preinitialized load module modifying system according to the second embodiment of the present invention which includes the modification restoring means for restoring a program image before modification from a program image in a modified portion of the preinitialized load module which is indicated by a modification restoring command according to the modification restoring command instructing the restoration provides an effect that it is possible to easily restore the program image before modification from the program image in the modified portion of the pre-initialized load module.

Referring to FIG. 1, the preinitialized load module modifying system according to the third embodiment will be described. In the third preinitialized load module modifying system, the main memory 3 includes a modification history table 304 in which the modification history record portion 202 is loaded.

The modifying portion 4 includes a modification history record loading program (referred to as "modification history record loading means", hereinafter) 410 which is a program for loading a content of the modification history record portion 202 in the modification history table 304 and a modification history record editing program (referred to as "modification history record editing means", hereinafter) 411 which is a program for editing the content of the modification history record portion 202 loaded in the modification history table 304.

An operation of the third embodiment of the present invention will be described with reference to FIGS. 1, 15 and 16.

The operation in which a modification history list 7 indicating the content of modification performed for the preinitialized load module 2 will be described below.

When an operator outputs the list of modification history 7, he inputs an activation instruction to the modification history record loading means 410 through a key board (not shown), etc.

Figure 15:
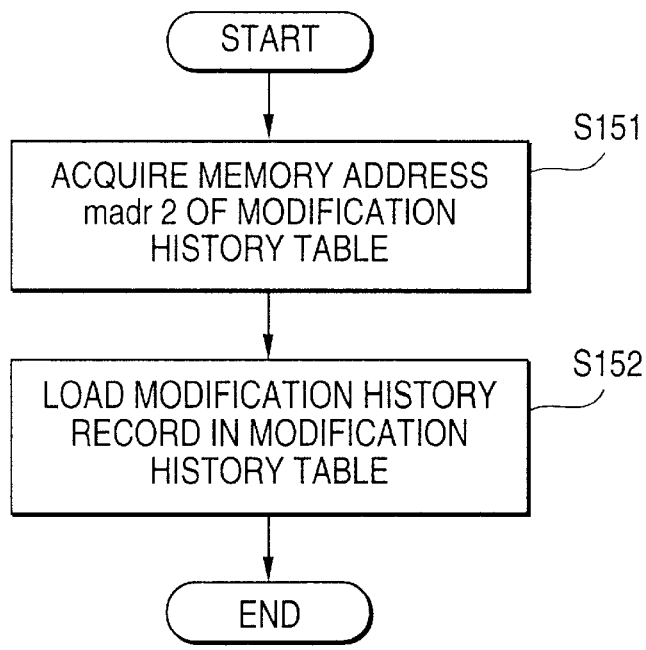
FIG. 15 is a flowchart showing a processing to be performed by a modification history record loading means 410 of the third embodiment of the present invention.

The modification history record loading means 410 responds to the activation instruction to store a memory address madr2 of the modification history table 304 (step S151) and load the content of the modification history record portion 202 in the modification history table 302 on the basis of the memory address madr2 (step S152), as shown in FIG. 15.

Figure 16:
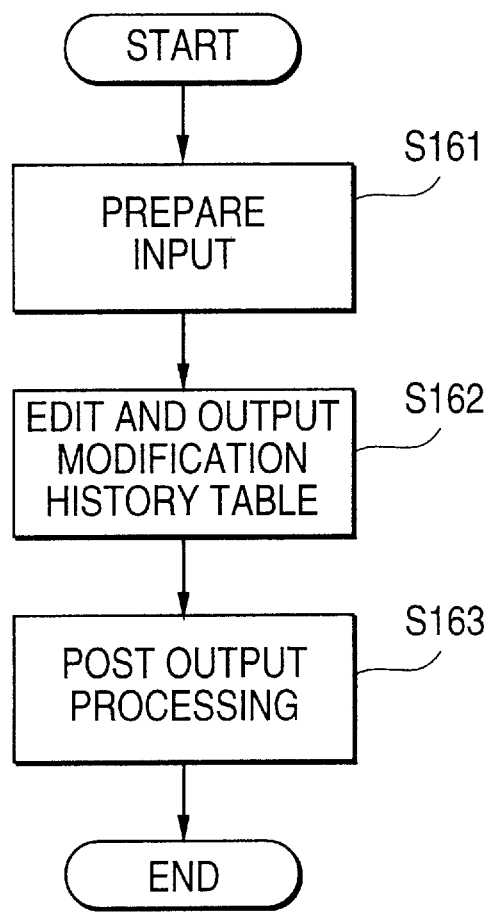
FIG. 16 is a flowchart showing a processing to be performed by a modification history record editing means 411 of the third embodiment of the present invention.

When the processing of the modification history record loading means 410 is completed, the modification history record editing means 411 prepares an output to the printer 6 (step S161), edits the content of the modification history table 302 in a table format and outputs it to the printer 6 as the list of modification history 7 (step S162) and then performs a post output processing for the printer 6 (step S163), as shown in FIG. 16.

Thus, the processing of the preinitialized load module modifying system according to the third embodiment of the present invention is completed.

The preinitialized load module modifying system according to the third embodiment of the present invention which includes the modification history record editing means for editing and outputting the content of the modification history record portion provides an effect that it is possible to output the list of modification history indicating the content of modification.

As described hereinbefore, the features of the present invention reside in, when the preinitialized load module 2 is modified, that the modifying command analysis means 401 registers the modifying commands in the modifying command table 302, that the preinitialized load module loading means 402 loads the program portion 201 in the main memory 3, that the modifying command processing means 403 modifies the program image 301 according to the modifying command, that the preinitialized load module unloading means 404 reflects the image after modification to the program portion 201 and that the modifying command table unloading means 405 reflects the content of the modifying command table 302 to the modification history record portion 202, and, when the image before modification is restored from in the modified portion, that the modification restoring command analysis means 407 registers the modification restoring command in the modification restoring command table 303, that the modification history acquiring means 408 acquires the modifying command corresponding to the modification restoring command from the modification history record portion 202 and that the modification restoring means 409 restores the image before modification from the image in the portion indicated by the modifying command.

With these features of the present invention in which the preinitialized load module is constituted with the program portion and the modification history record portion and which includes the modifying command table unloading means for reflecting the content of the modifying command table on the modification history record portion after the modifying command processing means performs the modification according to the modifying command registered in the modifying command table, the present invention provides an effect that it is possible to manage the modification content for the preinitialized load module.

Further, since the present invention includes the modification restoring means which responds to a modification restoring command indicating a portion of the preinitialized load module which is modified and instructing a restoration of the program image before modification from the program image in that portion to restore the program image in that portion to the program image before modification, the present invention provides an effect that it is possible to easily restore the program image in the portion of the preinitialized load module which is modified to the program image before modification.

Further, the present invention which includes the modification history record editing means for editing and outputting the content of the modification history record portion provides an effect that it is possible to output the list of modification history indicating the content of modification.

What is claimed is:

1. A virtual memory computer system for providing modifications to a preinitialized load module, comprising:

a virtual memory including a main memory and a backing store;

wherein said preinitialized load module is loaded in said backing store of said virtual memory, said preinitialized load module having a program portion and a modification history record portion;

means for loading said program portion of said preinitialized load module to said main memory; and a modifying portion for providing modifications to said program portion of said preinitialized load module loaded in said main memory of said virtual memory, wherein said modifying portion comprises:

first registering means for registering a modifying command corresponding to said preinitialized load module in a modifying command table;

first loading means for loading said program portion of said preinitialized load module in said main memory as a program image;

modifying means for modifying said program image loaded in said main memory in accordance with said modifying command registered in said modifying command table to produce a modified program image;

first copying means for copying said modified program image to said program portion of said preinitialized load module; and adding means for adding said modifying command registered in said modifying command table to said modification history record portion of said preinitialized load module.

2. The virtual memory computer system as recited in claim 1, wherein said modifying command comprises an address indicating a location to be modified, a before-modification program image and an after-modification program image, and wherein said modifying means rewrites said program image in said main memory at said location indicated by said address of said modifying command with said after-modification program image from said modifying command.

3. The virtual memory computer system as recited in claim 2, further comprising:

second registering means for registering a modification restoring command in a modification restoring command table;

acquiring means for acquiring a modifying command corresponding to said modification restoring command from said modification history record portion of said preinitialized load module;

restoring means for restoring said program image loaded in said main memory in accordance with said acquired modifying command to produce a restored program image;

second copying means for copying said restored program image to said program portion of said preinitialized load module; and deleting means for deleting said acquired modifying command from said modification history record portion, wherein said virtual memory computer system is operative to restore said preinitialized load module.

4. The virtual memory computer system as recited in claim 3, wherein said modification restoring command comprises an address indicating a location to be restored, wherein said acquired modifying command is acquired by said acquiring means on the basis of having a same address as said address of said modification restoring command, and wherein said restoring means rewrites said program image in said main memory at said location indicated by said address of said modification restoring command with a before-modification program image corresponding to said acquired modifying command.

5. The virtual memory computer system as recited in claim 1, further comprising:

second loading means for loading a content of said modification history record portion in a modification history record table in said main memory;

editing means for editing said content of said modification history record portion; and outputting means for outputting said content of said modification history record portion.

6. In a computer system which employs a virtual memory management system having a main memory and a backing store, a preinitialized load module modifying system comprising:

a preinitialized load module loaded in said backing store, said preinitialized load module including a program portion and a modification history record portion;

modifying command analyzing means for registering a modifying command corresponding to said preinitialized load module in a modifying command table;

preinitialized load module loading means for loading said program portion of said preinitialized load module in said main memory as a program image;

modifying command processing means for modifying said program image in said main memory in accordance with said modifying command to produce a modified program image;

program image unloading means for copying said modified program image from said main memory to said program portion of said preinitialized load module in said backing store; and modifying command table unloading means for adding said modifying command to said modification history record portion, wherein said preinitialized load module modifying system is operative to manage modifications to said preinitialized load module.

7. The preinitialized load module modifying system as recited in claim 6, wherein said modifying command comprises a modifying position for said preinitialized load module, a program image before modification and a program image after modification, and wherein said modifying command processing means modifies said program image in said main memory from said program image before modification to said program image after modification.

8. The preinitialized load module modifying system as recited in claim 7, further comprising:

modification restoring command analyzing means for registering a modification restoring command in a modification restoring command table;

modification history acquiring means for acquiring a modifying command corresponding to said modification restoring command from said modification history record portion;

modification restoring means for restoring said program portion loaded in said main memory in accordance with said modifying command acquired by said modification history acquiring means;

program image unloading means for copying said program image in said main memory restored by said modification restoring means to said program portion of said preinitialized load module; and modifying command deleting means for deleting said modifying command, used by said modification restoring means to restore said program image in said main memory, from said modification history record portion, wherein said preinitialized load module modifying system is operative to restore said preinitialized load module.

9. The preinitialized load module modifying system as recited in claim 8, wherein said modification restoring command comprises an address indicating a location to be restored, wherein said modification history acquiring means acquires said modifying command on the basis of having a same address as said address of said modification restoring command, and wherein said modification restoring means modifies said program image in said main memory at said location indicated by said address of said modification restoring command with a program image before modification corresponding to said modifying command acquired by said modification history acquiring means.

10. The virtual memory computer system as recited in claim 6, further comprising:

modification history loading means for loading a content of said modification history record portion in a modification history record table in said main memory;

modification history record editing means for editing said content of said modification history record portion loaded in said modification history table by said modification history record loading means; and outputting means for outputting said content of said modification history record portion as a list of modification history.

11. A method for modifying a preinitialized load module in a computer system which employs a virtual memory including a main memory and a backing store, wherein said preinitialized load module includes a program portion and a modification history record portion and said preinitialized load module is loaded in said backing store of said virtual memory, said method comprising the steps of:

(A) registering a modifying command corresponding to said preinitialized load module in a modifying command table;

(B) loading said program portion of said preinitialized load module in said main memory as a program image;

(C) modifying said program image loaded in said main memory in accordance with said modifying command registered in said modifying command table to produce a modified program image;

(D) copying said modified program image to said program portion of said preinitialized load module in said backing store; and (E) adding said modifying command registered in said modifying command table to said modification history record portion of said preinitialized load module in said backing store.

12. The method for modifying a preinitialized load module as recited in claim 11, wherein said modifying command comprises an address indicating a location to be modified, a before-modification program image and an after-modification program image, wherein step (C) comprises:

rewriting said program image in said main memory at said location indicated by said address of said modifying command with said after-modification program image from said modifying command.

13. The method for modifying a preinitialized load module as recited in claim 12, further comprising the steps of:

(F) registering a modification restoring command in a modification restoring command table;

(G) acquiring a modifying command corresponding to said modification restoring command from said modification history record portion of said preinitialized load module;

(H) restoring said program image loaded in said main memory in accordance with said acquired modifying command to produce a restored program image;

(I) copying said restored program image to said program portion of said preinitialized load module; and (J) deleting said acquired modifying command from said modification history record portion.

14. The method for modifying a preinitialized load module as recited in claim 13, wherein said modification restoring command comprises an address indicating a location to be restored, wherein step (G) comprises acquiring said acquired modifying command on the basis of having a same address as said address of said modification restoring command, and wherein step (H) comprises rewriting said program image in said main memory at said location indicated by said address of said modification restoring command with a before-modification program image corresponding to said acquired modifying command.

15. The method for modifying a preinitialized load module as recited in claim 11, further comprising the steps of:

(K) loading a content of said modification history record portion in a modification history record table in said main memory;

(L) editing said content of said modification history record portion; and (M) outputting said content of said modification history record portion.

* * * * *